United States Patent Office 3,296,202
Patented Jan. 3, 1967

3,296,202
PROCESS FOR CURING POLYEPOXIDES
Robert Schmitz-Josten, Cologne-Stammheim, and Rolf Kubens, Gunter Frank, and Richard Wegler, Leverkusen, Germany, assignors to Farbenfabriken Bayer Aktiengesellschaft, Leverkusen, Germany, a German corporation
No Drawing. Filed Apr. 16, 1963, Ser. No. 273,317
Claims priority, application Germany, May 11, 1962, F 36,777
8 Claims. (Cl. 260—47)

The subject of this invention is hardenable moulding and coating masses derived from an epoxide resin and an acid anhydride or acid anhydride mixture which is liquid at room temperature as well as a process for curing polyepoxides with such specific curing agents.

It is known that epoxide resins may be hardened by acid anhydrides of polybasic carboxylic acids. By epoxide resins are to be understood compounds which contain more than one epoxide group in the molecule. The acid anhydrides that have been mentioned in this connection are mainly cyclic dicarboxylic acid anhydrides such as phthalic acid anhydride, hydrogenated phthalic acid anhydrides, maleic acid anhydride, methyl-endomethylene-tetrahydrophthalic acid anhydride and succinic acid anhydride and mixtures of anhydrides melting above 100° C. with anhydrides melting at lower temperatures. Many of the acid anhydrides that have been proposed are solid at room temperature and must be melted or mixed at elevated temperatures with epoxide resin before they can be used so that the time during which they can be used is reduced. Liquid anhydrides, e.g. dodecenyl succinic acid anhydride or tetrapropinyl-succinic acid anhydride have the disadvantage that the epoxide resins hardened with them have poor heat resistance. The eutectic mixtures of acid anhydride which have also been proposed, have lower melting points than the pure components but again the mixtures are not liquid at room temperature. Methyl-endomethylene-tetrahydrophthalic acid anhydride, which is liquid at room temperature and has a melting point below 12°, can be used only if special precautions are taken, owing to its very high toxicity.

It has now been found that excellent hardenable moulding and coating masses may be obtained from epoxide resin by using a hexahydrophthalic acid anhydride substituted in the 3- or 4-position by a methyl group, or mixtures of such anhydrides, as hardening agents for liquid epoxide resins.

The methyl-hexahydrophthalic acid anhydrides or mixtures thereof are still liquid at about 0° C. and are non-toxic and relatively resistant to moisture. The 3- or 4-methyl-hexahydrophthalic acid anhydrides may be obtained either by hydrogenating the corresponding 3- or 4-methyl-phthalic acid anhydrides or by hydrogenating the addition products obtained by diene synthesis from maleic acid anhydride and isoprene or cis- or trans-piperylene (1-methylbutadien-1:3). Owing to their method of preparation, these hydrogenation products are stereo-isomeric 3- or 4-methylhexahydrophthalic acid anhydrides. For their preparation, it has been found particularly advantageous to use the so-called $C_5$-fraction obtained in technical cracking reactions, if desired after removal of the cyclopentadiene contained in this fraction. This $C_5$-fraction contains olefines mainly with 5 C-atoms, monoolefines (e.g. pentene), cyclopentene, diolefines (e.g. isoprene) and piperylene.

These may easily be isolated by reacting this fraction with a quantity of maleic acid anhydride corresponding to the diene content.

In their physiological action, the compounds described above are similar to hexahydrophthalic acid anhydride which melts at 33° C. and is known to be substantially harmless. Another advantage is that these compounds are less sensitive to moisture than hexahydrophthalic anhydride. When hexahydrophthalic anhydride is brought into contact with moist air, some hexahydrophthalic acid is invariably formed and crystallises out and will not dissolve in epoxide resins at room temperature, but the anhydrides according to the invention do not have this disadvantage.

In accordance with the invention, liquid polyepoxides with an epoxide equivalency, i.e.

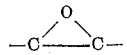

equivalency, of 2 to 0.1 are used for preparing these hardenable moulding and coating compounds. The following compounds may be used, 0.6 to 1.2 acid anhydride groups being used per epoxide group: glycidyl polyether of polyhydric phenols such as 4,4'-dihydroxy-diphenyl-dimethylmethane, glycidyl polyether of polyhydric alcohols such as 1,4-butane-diol, glycidyl polyether of polyhydric thiols such as bis mercapto methylbenzene; basic epoxide compounds, such as the di-N-glycidyl compound of N,N'-dimethyl-4,4'-diamino-diphenyl-methane; glycidyl esters of di- and polycarboxylic acids, such as phthalic acid di-glycidyl ester; N,N'-diepoxypropyloxamide and higher homologues; cyanuric acid-triglycidyl esters and other di- and triepoxides based on s-triazine; epoxidation products of polyunsaturated compounds such as vegetable oils and their conversion products, epoxidation products of di- and polyolefines such as butadiene, vinylcyclohexane, 1,5-cyclooctadiene and 1,5,9-cyclododecatriene; unsaturated polymers and copolymers such as polybutadiene, polyisoprene, butadiene-styrene copolymers, divinylbenzene and dicyclopentadiene; unsaturated polyesters as well as epoxidation products which are obtainable by Diels-Alder addition, e.g. by epoxidation of cyclohexene derivatives and cyclopentene derivatives.

The polyepoxide compounds may also be polymers and copolymers of unsaturated monoepoxides, e.g. glycidylmethacrylate, vinyl- and allyl-epoxystearate, vinylglycide ether, divinyl-benzene-monoepoxide or 3,4-epoxy-cyclohexane carboxylic acid allyl ester; the polymerisation may, if desired, be carried out simultaneously with hardening by the polycarboxylic acid anhydrides according to the invention.

According to the preferred embodiment of this invention we apply glycidyl polyethers of polyhydric compounds such as polyhydric alcohols and polyhydric phenols, said glycidyl ethers having an epoxy equivalency of at least 0.1 and a molecular weight above about 200.

Curing is effected in the usual manner by heating the homogeneous mixtures of the polyepoxide and curing agents, to temperatures between 50° C. and 280° C., preferably 120 to 220° C. Known catalysts are used to accelerate the reaction, e.g. teritary amines, boron fluoride and its addition products with alcohols, glycols, ethers, thio-ethers and amines. Tertiary amines are applied in amounts of between 0.1 and 2% by weight, calculated on the sum of anhydride and polyepoxide. The tertiary amines may themselves contain epoxide groups. In addition, metal catalysts and complex compounds may be used, e.g. triethanolamine borate. The reaction velocity does not differ substantially from that of hexahydrophthalic anhydride which melts at 33° C. Liquid mixtures of the anhydrides according to the invention with known anhydrides such as hexahydrophthalic anhydride may also be used. The exothermic production of heat is considerably less, and this is an advantage particularly in the production of large castings. As the examples given for comparison in Tables 1 and 2 show, another advantage lies in the lower viscosity of the anhydrides themselves and of the mixtures of epoxide resin and the acid anhydrides according to the invention compared with hexahydrophthalic anhydride and methyl-endomethylene-tetrahydrophthalic anhydride. This ensures that the casting resin will fill any gaps more completely and enables a larger quantity of filler to be used.

TABLE 1

*Viscosity of acid anhydrides at various temperatures*

| Compounds | Viscosity in cp. | | | |
| --- | --- | --- | --- | --- |
| | 20° C. | 40° C. | 60° C. | 80° C. |
| 4-Methylhexahydrophthalic anhydride prepared according to Example 1 | 81 | 27 | 11 | 6.3 |
| Mixture of methylhexahydrophthalic anhydride prepared according to Example 2 | 91 | 29 | 13 | 7.2 |
| Hexahydrophthalic anhydride | solid | 63 | 27 | 10.5 |
| Methyl-endomethylene-tetrahydrophthalic anhydride | 376 | 78 | 27 | 11 |

TABLE 2

*Viscosities of mixtures of epoxide resin and anhydride*

[Viscosities of mixtures of an epoxide resin prepared from 4, 4'-dihydroxydiphenyl-dimethylmethane and epichlorohydrin with an epoxide number of 0.5 and different acid anhydrides.]

| Anhydride used in the mixture | Viscosity in cp. | | | |
| --- | --- | --- | --- | --- |
| | 20° C. | 40° C. | 60° C. | 80° C. |
| 4-Methyl-hexahydrophthalic anhydride prepared according to Example 1 | 1,395 | 204 | 56.3 | 22.7 |
| Mixture of methylhexahydrophthalic anhydride prepared according to Example 2 | 1,675 | 215 | 61.0 | 24.7 |
| Hexahydrophthalic anhydride | 1,750 | 238 | 67.0 | 31.6 |
| Methyl-endo-methylene-tetra hydrophthalic anhydride | 3,530 | 368 | 82.5 | 36.4 |

In all the mixtures, the proportions of quantities were so chosen that there was 0.9 anhydride group for each epoxide group.

0.6 to 1.2 anhydride groups are used per epoxide group for the hardening process. The mechanical and thermal properties are excellent, as shown in the following table.

TABLE 3

*Mechanical and thermal properties*

Epoxide resin I: Prepared from 4,4'-dihydroxydiphenyl-dimethylmethane and epichlorohydrin with an epoxide number of 0.285. This resin was hardened with three different acid anhydrides for 36 hours at 120° C., 0.68 acid anhydride group being present for each epoxide group.

Epoxide resin II: Prepared from aniline and epichlorohydrin with an epoxide number of 0.83. This resin was hardened for 24 hours at 120° C. with three different acid anhydrides, 1.17 anhydride groups being present for each epoxide group.

Anhydride I: 4-methylhexahydrophthalic anhydride prepared according to Example 1.
Anhydride II: Hexahydrophthalic anhydride.
Anhydride III: Methyl-endomethylene-tetrahydrophthalic anhydride.

| Composition of the test compounds | Impact strength in DIN 53,453, kp./cm.$^2$ | Flexural strength in DIN 53,452, kp./cm.$^2$ | Dimensional stability in the heat in DIN 53,458, ° C. |
| --- | --- | --- | --- |
| Epoxide resin I+Anhydride I | 42.3 | 1,500 | 96 |
| Epoxide resin I+Anhydride II | 18.6 | 1,410 | 91 |
| Epoxide resin I+Anhydride III | 12.6 | 1,320 | 68 |
| Epoxide resin II+Anhydride I | 13.4 | 1,570 | 120 |
| Epoxide resin II+Anhydride II | 9.8 | 970 | 116 |
| Epoxide resin II+Anhydride III | 12.6 | 1,055 | 87 |

The following examples serve to explain the invention. The parts given in the examples are parts by weight.

Examples 1–3 describe the preparation of liquid anhydrides or anhydride mixtures of 3- and/or 4-methyl-hexahydrophthalic acids.

*Example 1.*—100 parts by weight of maleic acid anhydride are melted and reacted at 55 to 60° C. with 72 parts by weight of isoprene, the heat of reaction being removed. The mixture is then stirred for 3 hours at 65° C. The crude adduct is hydrogenated at 110° C. at a hydrogen pressure of 100 atmospheres above atmospheric pressure after the addition of 7 parts by weight of Raney nickel free from alcohol. After separating off the catalyst, a mixture of stereoisomeric 4-methylhexahydrophthalic anhydrides of boiling point 114° at 0.2 mm. Hg is obtained on fractional distillation. The refractive index of the individual fractions increases from $$n_D^{20} = 1.4760$$

to $n_D^{20} = 1.4775$. The saponification number of the combined fractions is 669.

*Example 2.*—A fraction of a cracked petroleum fraction normally boiling at 35 to 55° C. (the so-called $C_5$ fraction) is used. Gas chromatographic analysis shows that this fraction contains 11% isoprene, 3.8% trans-pentadiene-1,3, 3.4% cis-pentadiene-1,3 and 10.2% cyclopentadiene in addition to other saturated and mono-unsaturated $C_5$ hydrocarbons.

5.5 parts by weight of maleic acid anhydride and 0.1 part by weight of 2,4,6-tri-tertiary butyl phenol are melted in an autoclave equipped with stirrer and treated for 2 hours at 55° with 12.5 parts by weight of the cracked petroleum fraction described above with cooling. The mixture is then stirred for another 2 hours at 55° C. and for 5 hours at 100°. The unreacted components are then distilled off. The distillation residue is hydrogenated in the presence of 6% alcohol-free Raney nickel at 110° C. and a hydrogen pressure of 100 atmospheres above atmospheric pressure. The hydrogenation product freed from catalyst is distilled in vacuo. Following a small preliminary fraction, an anhydride mixture distills over at 114 to 124° C. at 0.3 mm. Hg. Endomethylene-hexahydrophthalic anhydride, which crystallises out on cooling, is removed by filtration. The filtrate, which remains liquid at room temperature, has a saponification number of 673 and contains the stereoisomeric 3- and 4-methyl-hexahydrophthalic anhydrides.

*Example 3.*—8.35 parts by weight of a hydrocarbon mixture which contains 4.35% trans-pentadiene-1,3 and 2.09% cis-pentadiene-1,3 is heated for 10 hours at 100° C. with 1.12 parts by weight of maleic acid anhydride and 0.1 part by weight of 4-methyl-2,6-ditertiary butyl phenol, and the mixture is then heated for another 5 hours at 150° C. The reaction product is worked up as described in Example 1. The fraction boiling at 130 to 160° at 13 mm. Hg is hydrogenated and worked up as described in Example 1. A mixture of stereoisomeric 3-methyl-hexahydrophthalic anhydride which boils at 145 to 155° C. and which remains liquid at room temperature and has a saponification number of 661 is obtained.

The following example described the preparation of the hardenable moulding- and coating mass with the aid of 3- and/or 4-methylhexahydrophthalic anhydrides.

*Example 4.*—100 parts by weight of an epoxide resin prepared from 4,4'-dihydroxy-diphenyl methyl methane and epichlorohydrin with an epoxide equivalent of 200, are dissolved in 75 parts by weight of methyl hexahydrophthalic anhydride and mixed with 1.7 parts by weight of dimethylbenzylamine. Since all the components are liquid at room temperature, they may easily be mixed without heating. The homogeneous mixture obtained is poured into metal forms which have previously been treated with a silicone mould parting agent, and the mixture is then hardened by keeping the forms in a heating cupboard for 5 hours at 100° C.

Clear, transparent castings free from bubbles are obtained. Their colour depends only on the colour of the epoxide resin used.

We claim:

1. A process for producing a cured product which comprises heating to a temperature between 50° C. and 280° C. a mixture of a 1,2-polyepoxide having a polyepoxide equivalency between 0.1 and 2.0 and at least one curing agent selected from the group consisting of 3-methyl-hexahydrophthalic anhydride and 4-methyl-hexahydrophthalic anhydride, said mixture containing 0.6 to 1.2 mols of said curing agent per mol of epoxy group present in said polyepoxide.

2. The process of claim 1 wherein said polyepoxide is a glycidyl polyether of a polyhydric compound selected from the group consisting of polyhydric alcohols and polyhydric phenols, said glycidyl polyether having a molecular weight above about 200 and wherein a mixture of said curing agents is employed.

3. The process of claim 2 wherein said mixture includes 0.1 to 2.0% by weight, calculated on the total amount by weight of said polyepoxide and said mixture of curing agents, of a tertiary amine.

4. An uncured epoxide resin composition containing as essential ingredients a 1,2-polyepoxide having an epoxide equivalency between 0.1 and 2.0 and at least one curing agent selected from the group consisting of 3-methyl-hexahydrophthalic anhydride and 4-methyl-hexahydrophthalic anhydride, said composition containing 0.6 to 1.2 mols of said curing agent per mol of epoxy group present in said polyepoxide.

5. The uncured epoxide resin of claim 4 wherein said polyepoxide is a glycidyl polyether of a polyhydric compound selected from the group consisting of polyhydric alcohols and polyhydric phenols, said glycidyl polyether having a molecular weight above about 200, and said curing agent is a mixture of 3-methyl-hexahydrophthalic anhydride and 4-methyl-hexahydrophthalic anhydride.

6. A cured 1,2-polyepoxide, said polyepoxide prior to curing with a curing agent, having an epoxide equivalency between 0.1 and 2.0, said curing agent consisting of at least one member selected from the group consisting of 3-methyl-hexahydrophthalic anhydride and 4-methyl-hexahydrophthalic anhydride and the amount of said curing agent being from 0.6 to 1.2 mols per mol of epoxy group present in said polyepoxide prior to curing.

7. The cured polyepoxide resin of claim 6 wherein said polyepoxide, prior to curing, is a glycidyl polyether of a polyhydric compound selected from the group consisting of polyhydric alcohols and polyhydric phenols, said glycidyl polyether having a molecular weight above about 200 and wherein said curing agent is a mixture of 3-methyl-hexahydrophthalic anhydride and 4-methyl-hexahydrophthalic anhydride.

8. The cured polyepoxide resin of claim 7 including 0.1 to 2.0% by weight, calculated on the total amount by weight of said polyepoxide and said mixture of curing agents, of a tertiary amine.

References Cited by the Examiner
UNITED STATES PATENTS 2,768,153   10/1956   Shokal _____ 260—47
2,935,488   5/1960    Phillips et al. _____ 260—47

WILLIAM H. SHORT, *Primary Examiner.*

SAMUEL H. BLECH, *Examiner.*

T. KERWIN, *Assistant Examiner.*